United States Patent [19]

Vogel

[11] 4,392,692
[45] Jul. 12, 1983

[54] SEAT SUPPORT SLIDE TRACK STRUCTURE

[76] Inventor: Ignaz Vogel, Kleinsteinbacherstr.42, Karlsruhe, Fed. Rep. of Germany, 7500

[21] Appl. No.: 282,515

[22] Filed: Jul. 13, 1981

[30] Foreign Application Priority Data

Jul. 31, 1980 [DE] Fed. Rep. of Germany ....... 3029127

[51] Int. Cl.³ .......................... F16C 29/10; F16B 7/10; F16B 21/12
[52] U.S. Cl. .................................... 308/6 R; 403/108; 403/323
[58] Field of Search .................. 308/6 R, 3.8, 3 R, 3.6, 308/237 R; 248/429, 430, 393; 297/346; 403/108, 323, 326

[56] References Cited

U.S. PATENT DOCUMENTS

| 1,728,655 | 9/1929 | Beutner | 248/393 |
| 2,307,305 | 1/1943 | Saunders et al. | 308/3.8 |
| 3,001,835 | 9/1961 | Kramer | 308/6 R |
| 4,241,960 | 12/1980 | Hentschel | 308/237 |

FOREIGN PATENT DOCUMENTS

| 940208 | 3/1956 | Fed. Rep. of Germany | 248/430 |
| 648183 | 1/1951 | United Kingdom | 248/429 |
| 1365966 | 9/1974 | United Kingdom | 308/3.8 |

Primary Examiner—Stuart S. Levy
Assistant Examiner—Thomas R. Hannon
Attorney, Agent, or Firm—Klaus J. Bach

[57] ABSTRACT

A slide track structure for supporting a passenger seat consists of a U-shaped track disposed completely within a square tube supported on the track by balls arranged in the U-track between waved guide strips mounted opposite each other on the track and the square tube and forming a channel receiving the balls. At least one of the guide strips is resiliently supported to bias the square tube so as to cause engagement of the flat adjacent surfaces of the U-track and the square tube when no load is carried by the track. The track is mounted on support bases projecting through slots in the square tube to permit movement of the square tube relative to the U-track.

9 Claims, 4 Drawing Figures

SEAT SUPPORT SLIDE TRACK STRUCTURE

BACKGROUND OF THE INVENTION

The invention relates to a slide track structure especially for slidably supporting passenger seats and locking them in predetermined positions.

Slide tracks of this type have either friction bearings or they have ball or roller bearings. Especially for passenger seats, slide tracks with friction bearings have been preferred, so far, because this type is generally more suitable for the requirements of movability and lockability of passenger seats. Passenger seats, for example, in spite of their adjustability, must be securely mounted on a vehicle chassis such that they can withstand relatively forceful crashes, they must be so mounted that they give the occupant the feeling of being safely seated. That is, they cannot be mounted in a floating manner, but they must be safely locked in any desired position; the adjustment mechanism must have a relatively long life; and, especially, they must remain rattle-free at all times no matter whether the seat is occupied or not.

Although the requirements of secure mounting can be achieved for slide tracks with friction bearings as well as for those with anti-friction bearings, it is generally much easier to make slide tracks with friction bearings rattle-free. On the other hand, slide tracks with anti-friction bearings have a longer operating life than those with friction bearings.

Since a long operating life which should be at least as long as the life of the seats is required, more and more seats are provided with slide tracks with ball or roller bearings. Freedom of rattling is generally achieved for such slide tracks by additional balls or rollers which are preloaded by springs or elastomer material and force the two relatively movable tracks of the slide track into engagement with each other. This is naturally done in the load direction of a seat such that a preload is applied to the slide track in a loading sense. Added thereto is the actual load when a seat is occupied by a passenger so that these slide tracks must be very sturdy and, consequently, quite heavy. In addition, the seats are not easy to move and require relatively large operating forces for changing the seat position.

Since, however, also relatively weak persons should be able to adjust the seats, seat support slide track should be easily operable.

It is therefore the object of the present invention to provide a seat slide track which provides for secure connection between a solidly mounted support and a part which is movable relative to the support, which is lightweight and rattle-free, which is easily movable and which is simple and inexpensive to manufacture.

SUMMARY OF THE INVENTION

A slide track for adjustably supporting movable passenger seats and locking them in different positions, consisting of two tracks movable relative to each other on balls arranged therebetween has ball guide straps supported on the tracks by elastomer support means and one of the tracks has a portion extending around the other track for engagement therewith when the elastomer support means is not compressed by a load to prevent rattling of the slide track when not loaded. Relative movement of the tracks, however, is facilitated when loaded as the portion extending around the other track is disengaged from the other track upon application of a load; that is, when a seat supported by the slide tracks is occupied. Further, means are provided for locking the two tracks with each other in predetermined relative positions.

In contrast to the prior art seat slide tracks in which the two relatively movable tracks are preloaded in operating load direction, the arrangement according to the present invention includes two relatively movable tracks which are preloaded in a loading sense opposite to the operating load. Then, when actually loaded by their operating load, the actual load counteracts and reduces or eliminates the preload so that the final load on the seat slide track is reduced. Alone this reduction in load facilitates operation of the slide track.

The arrangement according to the invention utilizes the fact that a load carrying slide track will not rattle. A load is applied to the seat slide tracks according to the invention at all times: either a preload by means of the elastomer or a normal load for example, by a passenger occupying a seat. The slide track is therefore not only easily operable for an occupant but it is also rattle-free with or without a load.

Preferably, the slide track consists of a square tube receiving a U-shaped track, the square tube being movable relative to the track therein. This is not only advantageous because of a secure connection between the relatively movable parts of the slide tracks as one part extends within the other, but it eliminates also any chance of injury by the edges of the U-track. Furthermore, the U-track and the square tube together form a rigid structure which permits a slide track design of relatively little weight thereby reducing the dead weight to be carried by a vehicle. Furthermore, such a slide track is simple and may be manufactured very inexpensively.

In order to avoid scuffing of the relatively movable parts of the slide track, a slide sheet is preferably arranged between the adjacent surfaces of the U-shaped track and the square tube, which slide sheet preferably consists of spring steel. There are also guide strips for the bearing balls which, preferably, consist also of spring steel formed into a waved shape. The waved shape provides for a preload and adds to the resiliency provided by elastomer incorporated into this design. The elastomer is preferably disposed in the elongated spaces formed by the wavy spring steel strips between the spring strips and the U-track and square tubes, respectively. Surprisingly, elastomer tubes have been found to be especially advantageous with regard to service as well as operating life. It is particularly advantageous if the elastomer is a polyurethane elastomer.

For locking the slide track in predetermined positions, the square tube is preferably provided with a bore and a spring loaded ball which extends through this bore and is seated in predetermined openings formed in the U-track to engage the U-track. Suitably, the ball is forced into the opening by a cam engaging the ball and mounted on a spring loaded operating lever. Such positioning of the seat is not only very secure but the mechanism is easily operable even by weak persons.

DESCRIPTION OF THE PREFERRED EMBODIMENT

Figure 1:
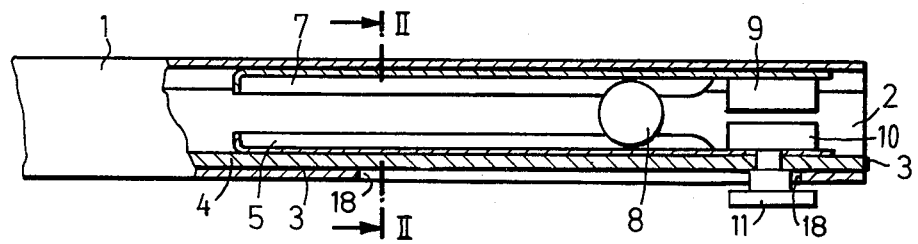
FIG. 1 is a side view, partially in section, of a slide track.
Figure 2:
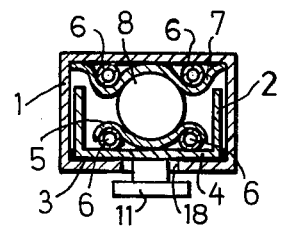
FIG. 2 is a sectional view along line II—II of FIG. 1.

FIG. 1 shows a slide track consisting of a square tube 1 of rectangular cross-section with a U-track 2 disposed therein. An anti-friction sheet 3 of spring steel is disposed between the adjacent surfaces of the square tube 1 and the U-track 2. Disposed within the U-track 2 on its web 4 is a lower guide strip 5 of waved cross-section with its center bent downwardly. Tubes 6 of elastomer are disposed in the cavities formed below the raised side portions of the guide strip 5. A similarly shaped upper guide strip 7 is disposed in the upper part of the square tube opposite the lower guide strip 5 and may also have tubes 6 of elastomer disposed in the cavities formed between its side portions and the top wall of the square tube 1. Bearing balls 8 are disposed within the square tube 1 and between the upper and lower guide strips 5, 7. The guide strips 5, 7 are connected to the U-track 2 and the square tube 1 by rivets 10 and 9, respectively. The rivet 10 is provided with a mounting base 11 which extends through a slot 18 formed in the square tube 1. Both rivets 9 and 10 are provided with threaded bores, the upper rivet 9 for receiving a bolt mounting a seat thereon and the lower rivet for bolting the U-track 2 onto a support base. The elastomer tubes 6 provide sufficient forces to firmly force the square tube onto the anti-friction sheet 3 and the lower surface of the U-track to prevent rattling of the guide track when no load is carried. A load applied to the square tube 1 will compress the tubes 6 slightly so that the adjacent surfaces of the U-track 2 and the square tube 1 separate slightly thereby permitting the square tube 1 (any any seat thereon) to be easily moved on the U-track 2 as the square tube and U-track are disengaged. Yet, because of the load, rattling will not occur.

Figure 3:
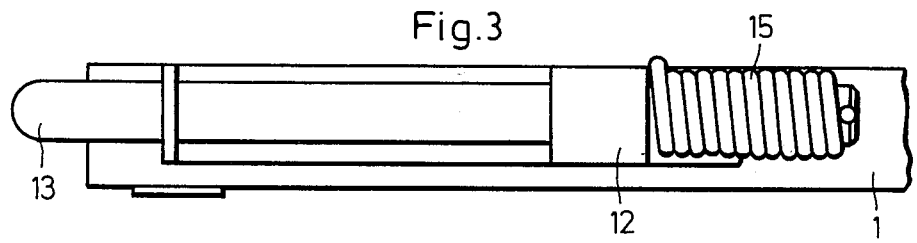
FIG. 3 is a side view of a slide track showing a locking mechanism attached thereto.
Figure 4:
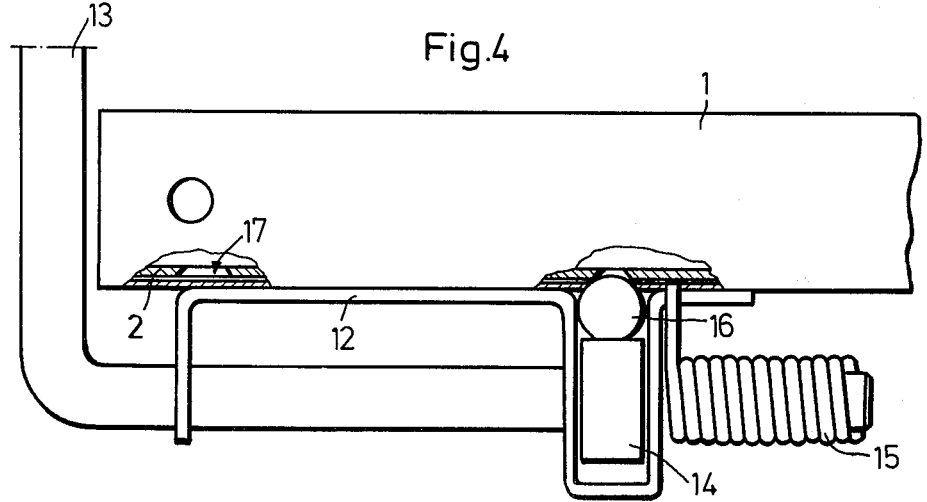
FIG. 4 is a top view of the structure shown in FIG. 3.

FIGS. 3 and 4 show a locking mechanism for locking the square tube 1 in position with the U-track 2. The square tube 1 has mounted on its side a bearing frame 12 which supports an operating lever 13 having an eccenter 14 associated therewith. A spring 15 mounted on the shaft of the lever 13 biases the lever shaft, that is the eccenter 14 mounted thereon against a ball 16 which projects through a bore in the square tube 1 into an opening 17 in the U-track 2. In this position, the ball 16 firmly interlocks the square tube 1 and the U-track 2. Pivoting of the operating lever 13 will permit the ball 16 to retract for the release of the interlock. Upon release of the lever 13, however, the ball 16 is again biased against the U-track and will automatically snap into the next U-track opening after slide adjustment of the square tube to engage the square tube with the U-track in a new position.

What I claim is:

1. A slide track structure especially for supporting passenger seats in different positions, said slide track structure comprising two tracks movable relative to each other in longitudinal direction and having opposed surfaces; guide strips disposed on the surfaces of said tracks facing each other; elastomer support means disposed between at least one of said guide strips and the associated track for resiliently supporting said guide strip on said track, said guide strips being waved to define therebetween a passage of essentially circular cross-section, and at least two balls disposed in said passage for supporting one of said tracks on the other, said one track being a square tube and the other being a U-track received within said square tube so as to engage said guide strips, said elastomer support means, said balls and the other U-track enclosed within said square track to prevent rattling when no load is supported by said slide track structure, said square tube having at least one slot formed in its bottom side and said U-track having connected thereto a mounting base, which extends through said slot in said square tube to permit movement of said square tube relative to said U-track when said mounting base is mounted on a support structure.

2. A slide track as claimed in claim 1, wherein an anti-friction sheet is disposed between the adjacent surfaces of said square tube and said U-track.

3. A slide track as claimed in claim 2, wherein said anti-friction sheet consists of spring steel.

4. A slide track as claimed in claim 1, wherein said guide strips are formed from a spring steel sheet.

5. A slide track as claimed in claim 4, wherein said guide strips are waved in cross-section with side portions raised from the walls of the respective adjacent walls of said square tube and said U-track so as to form cavities between the side portions of the guide strips and the respective adjacent walls of said square tube and said U-track and said elastomer support means are elongated of circular cross-section which are disposed in said cavities.

6. A slide track as claimed in claim 5, wherein said elastomer support means is in the form of a tube.

7. A slide track as claimed in claim 5, wherein said elastomer support means consists of a polyurethane elastomer.

8. A slide track as claimed in claim 1, wherein said square tube has a bore and said U-track has a number of openings formed therein adjacent said bore and a spring loaded ball is movably disposed in said bore so as to project into said opening to interlock said square tube and said U-track.

9. A slide track as claimed in claim 8, wherein said ball is engaged by an cam mounted on a spring loaded operating lever.

* * * * *